United States Patent

Shiosaki

[15] 3,691,552

[45] Sept. 12, 1972

[54] INVERSE DIGITAL TO ANALOG CONVERTER

[72] Inventor: James T. Shiosaki, Azusa, Calif.

[73] Assignee: Honeywell Inc., Minneapolis, Minn.

[22] Filed: May 17, 1971

[21] Appl. No.: 143,886

Related U.S. Application Data

[62] Division of Ser. No. 806,366, March 12, 1969, Pat. No. 3,588,871.

[52] U.S. Cl. ..........................340/347 DA, 235/198

[51] Int. Cl. ..........................................H03k 13/14

[58] Field of Search.........340/347 DA, 347; 315/8.5; 235/198

[56] References Cited

UNITED STATES PATENTS

| | | | |
|---|---|---|---|
| 3,320,409 | 5/1967 | Larrowe | 340/347 DA |
| 3,562,743 | 2/1971 | Lerouge et al. | 340/347 DA |
| 3,305,857 | 2/1967 | Barber | 340/347 DA |
| 3,579,229 | 5/1971 | Tripp | 340/347 DA |

*Primary Examiner*—Thomas A. Robinson
*Attorney*—Charles J. Ungemach, Albin Medved and Charles L. Rubow

[57] ABSTRACT

A digital to analog conversion circuit for producing an analog signal proportionally related to the length of a line segment whose quadrature components are represented by a pair of digital signals. The circuit comprises a constant current source and a current sink connected by current path means whose impedance is varied in accordance with the sum of first and second fractions of the larger and smaller digital signals respectively to produce the analog voltage at the input to the current path means. The current path means may comprise a plurality of parallel weighted resistive elements, each in series with a digitally controlled switching element. A logic circuit is provided for directing the larger and smaller digital signals to the appropriate switching elements.

8 Claims, 3 Drawing Figures

INVENTOR.
JAMES T. SHIOSAKI
BY Charles J. Ungemach
ATTORNEY

INVENTOR.
JAMES T. SHIOSAKI

BY Charles J. Ungemach
ATTORNEY

INVERSE DIGITAL TO ANALOG CONVERTER

CROSS REFERENCE TO RELATED APPLICATION

This application is a division of copending application Ser. No. 806,366, filed Mar. 12, 1969, now U.S. Pat. No. 3,588,871 issued June 28, 1971, for Control Writing Rate Display Control Apparatus in the name of the same inventor and assigned to the same assignee as the present application.

BACKGROUND OF THE INVENTION

The invention herein described pertains generally to digital to analog converters, and more specifically to a circuit for converting digital signals indicative of quadrature components of a line segment into an analog signal indicative of the length of the segment.

It has become common practice to produce visual presentations on a display device in accordance with information in digital form supplied by a computer or other source of digital signals. In such systems, display information is frequently contained in digital signals representing quadrature components of line segments which make up the visual presentation. These digital signals sequentially specify successive line segments in terms of differences in locations of the end points of each segment along orthogonal axes.

In producing a presentation on many conventional display devices, it is necessary to convert the digital signals into analog signals representing the line segments. Further, since it is desired to display the entire line segment, rather than only its end points, it it necessary that the display device draw or produce the line segment between the end points. Depending on the nature of the presentation to be displayed, the line segments may vary greatly in length. In the absence of means for equalizing writing rate, each line segment tends to be produced in the same length of time. Thus, the writing rate for a long line segment is greater than for a short line segment. Such a condition is disadvantageous in many display devices. For example, the brightness of the visual display in a CRT varies with writing rate. If the display is made sufficiently bright for the fastest writing rate, it may be excessively bright for lower writing rates. The latter condition causes degeneration of the luminescent material in a CRT.

Various schemes for producing a CRT display of uniform brightness from digital signals which basically produce all line segments in the same length of time have been devised. One such scheme is to modulate the CRT beam intensity in accordance with writing rate. Such a scheme, however, requires additional circuitry which tends to be unsatisfactorily complex because of non-linear relationships between writing rate and display brightness.

Various schemes have also been devised for producing an approximately uniform writing rate. This can be accomplished by determining the length of each line segment and controlling writing rate as an inverse proportional function thereof. One prior art scheme operates on the principle that an adequate approximation of line segment length is provided by a proportional function of the sum of the quadrature components of the segment. This approximation may be in error as much as 1.414 to 1. In another prior art scheme, line segment length is approximated by means of a two segment discontinuous transfer function. In this scheme, a given one of the quadrature components (for example, the X component) is scaled by a factor having one of two values depending on the ratio of the X and Y components.

The applicant has found that the following relationship can be advantageously used in his invention. The length of a line segment, in terms of quadrature components thereof, is accurately approximated with the function:

$$L = 0.96U + 0.4V$$

where $L$ = segment length $U$ = larger quadrature component $V$ = smaller quadrature component The approximation provided with this function is never in error by more that 6 per cent. The function is easily implemented with simple circuitry. Further, the signal produced thereby can be very easily converted into a voltage ramp in which the rate of voltage change is inversely proportional to the length of the line segment. Such a voltage ramp can be conveniently scaled in response to digital signals representing quadrature components of the line segment to produce analog signals as required for displaying the segment at a predetermined writing rate on a CRT or other display device.

SUMMARY OF THE INVENTION

The applican's inverse digital to analog converter basically comprises a constant current source and a current sink connected by variable impedance current path means. The impedance of the current path means is varied in response to digital signals which may represent quadrature components of a line segment. An analog voltage whose magnitude is inversely proportional to the quantity represented by the digital signals is produced at the input to the current path means. In approximating the length of a line segment, means is provided for selecting the larger and smaller of the quadrature components and varying the impedance in accordance with the sum of first and second functions of the larger and smaller components respectively. The magnitude of the analog voltage is then inversely proportional to the approximate length of the segment. The voltage may be supplied to a voltage controlled current generator for producing a current whose magnitude is also inversely proportional to the approximate length of the segment.

Accordingly, it is a primary object of this invention to provide a simple circuit for producing an analog signal inversely related to a digital signal.

It is a further object of this invention to provide a unique line length approximation circuit for producing an analog signal indicative of the length of a line segment represented by digitally specified quadrature components.

It is yet a further object of this invention to provide a unique digital to analog converter for use in apparatus for producing visual presentations from digital information.

DESCRIPTION OF THE PREFERRED EMBODIMENT

Figure 1:
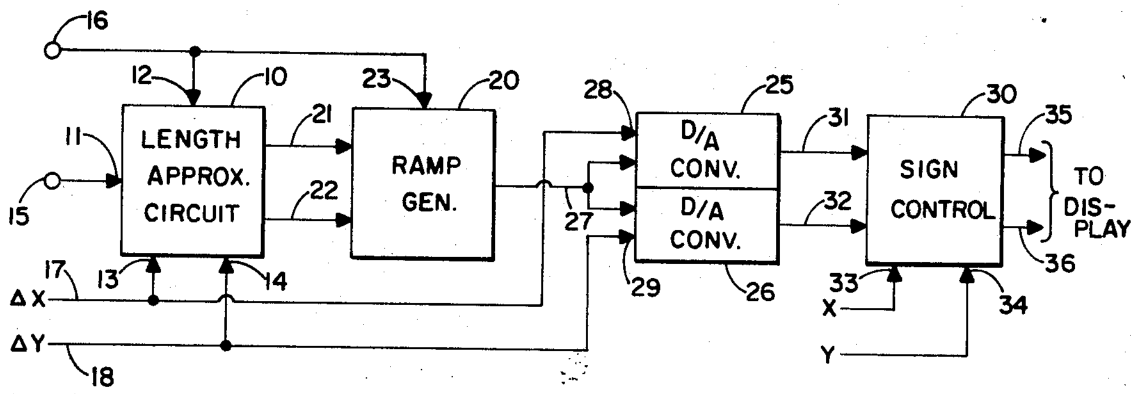
FIG. 1 is a block diagram of a system employing the applicant's line length approximation circuit for producing a visual display formed of a succession of digitally specified line segments.

FIG. 1 illustrates a system in which the applicant's unique line length approximation circuit is advantageously used to produce a visual display at a uniform writing rate. The length approximation circuit is generally identified by reference numeral 10. Circuit 10 includes a start signal input 11, a long line signal input 12, and two sets of digital signal inputs 13 and 14. The functions of signal inputs 11 and 12 will be described in greater detail hereinafter. Signal inputs 11 and 12 are respectively connected to a start signal terminal 15 and a long line signal terminal 16. Signal inputs 13 and 14 are connected to conductors 17 and 18 which respectively supply digital signals indicative of quadrature components $\Delta X$ and $\Delta Y$ of a line segment to be visually displayed.

Upon receipt of a start signal at signal input 11, length approximation circuit 10 generates a current whose magnitude is indicative of the approximate length of the line segment represented by the $\Delta X$ and $\Delta Y$ component signals on conductors 17 and 18. More specifically, the magnitude of the current is inversely proportional to the approximate length of the line segment. The operation of circuit 10 will be discussed in greater detail in connection with the description of FIGS. 2 and 3. The current produced by circuit 10 is supplied to a ramp generator 20 by means of a conductor 21. Circuit 10 also supplies a delayed start signal to generator 20 by means of a conductor 22. The delayed start signal inhibits operation of generator 20 for a predetermined length of time after receipt of a start signal at input 11. This feature insures that the operation of circuit 10 is allowed to stabilize after each receipt of additional digital information before allowing generator 20 to produce a voltage ramp based on the current supplied thereto. Ramp generator 20 also includes a long line signal input 23 which is connected to long line signal terminal 16.

Ramp generator 20 basically comprises a capacitor which is charged by the current generated by circuit 10. Thus, a ramp voltage is produced across the capacitor. The voltage across the capacitor is initially set to produce a predetermined voltage at the output of circuit 20 (in one embodiment, minus 1 volt). The capacitor is permitted to charge sufficiently to provide a second predetermined voltage at the output of circuit 20 (in the same embodiment, 10 volts). Thus, the time required for generation of a ramp between the two voltages varies in accordance with the current generated by circuit 10, and hence, in a proportional relationship with the length of the line segment represented by the $\Delta X$ and $\Delta Y$ component signals.

The voltage ramp is supplied to a pair of digital to analog converters 25 and 26 by means of a conductor 27. Converters 25 and 26 are also supplied with the $\Delta X$ and $\Delta Y$ component signals at digital signal inputs 28 and 29 respectively. Each of converters 25 and 26 produces a voltage ramp in the form of a scaled version of the ramp supplied thereto from generator 20. Converter 25 scales the voltage ramp in accordance with the $\Delta X$ component of the line segment to be displayed. Converter 26 scales the voltage ramp in accordance with the $\Delta Y$ component of the line segment.

The voltage ramps produced by converters 25 and 26 are supplied to a sign control circuit 30 by means of conductors 31 and 32 respectively. In circuit 30, each voltage ramp is either inverted or left unaltered in accordance with sign portions of the $\Delta X$ and $\Delta Y$ component signals. The sign portions of these signals are respectively supplied to inputs 33 and 34. Circuit 30 produces sign corrected voltage ramps which are carried on conductors 35 and 36. Thereafter the corrected voltage ramps are summed with positioning signals and supplied to a CRT or other display device.

The foregoing description of the system shown in FIG. 1 provides an adequate background against which the structural and operational features of the applicant's line length approximation circuit can be viewed. The structure and operation of the complete system are covered in detail in parent application Ser. No. 806,366.

Figure 3:
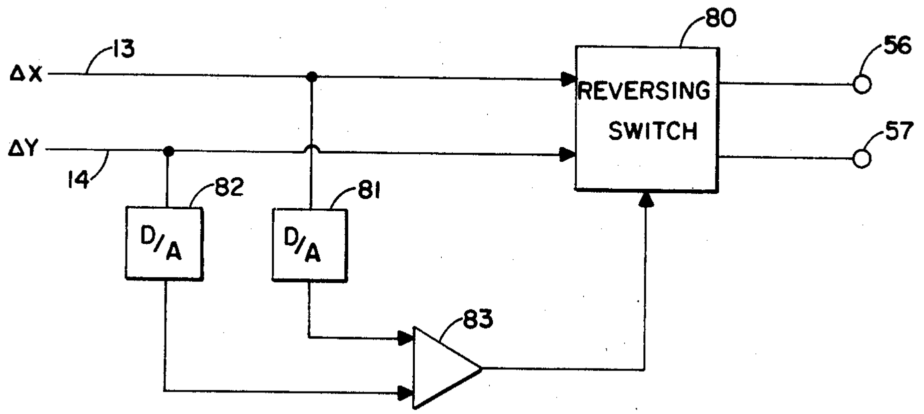
FIGURE 3 is a logic circuit in accordance with the applicant's invention for selectively supplying the larger and smaller of the pair of digital signals to the digital to analog converter of FIGURE 2.
Figure 2:
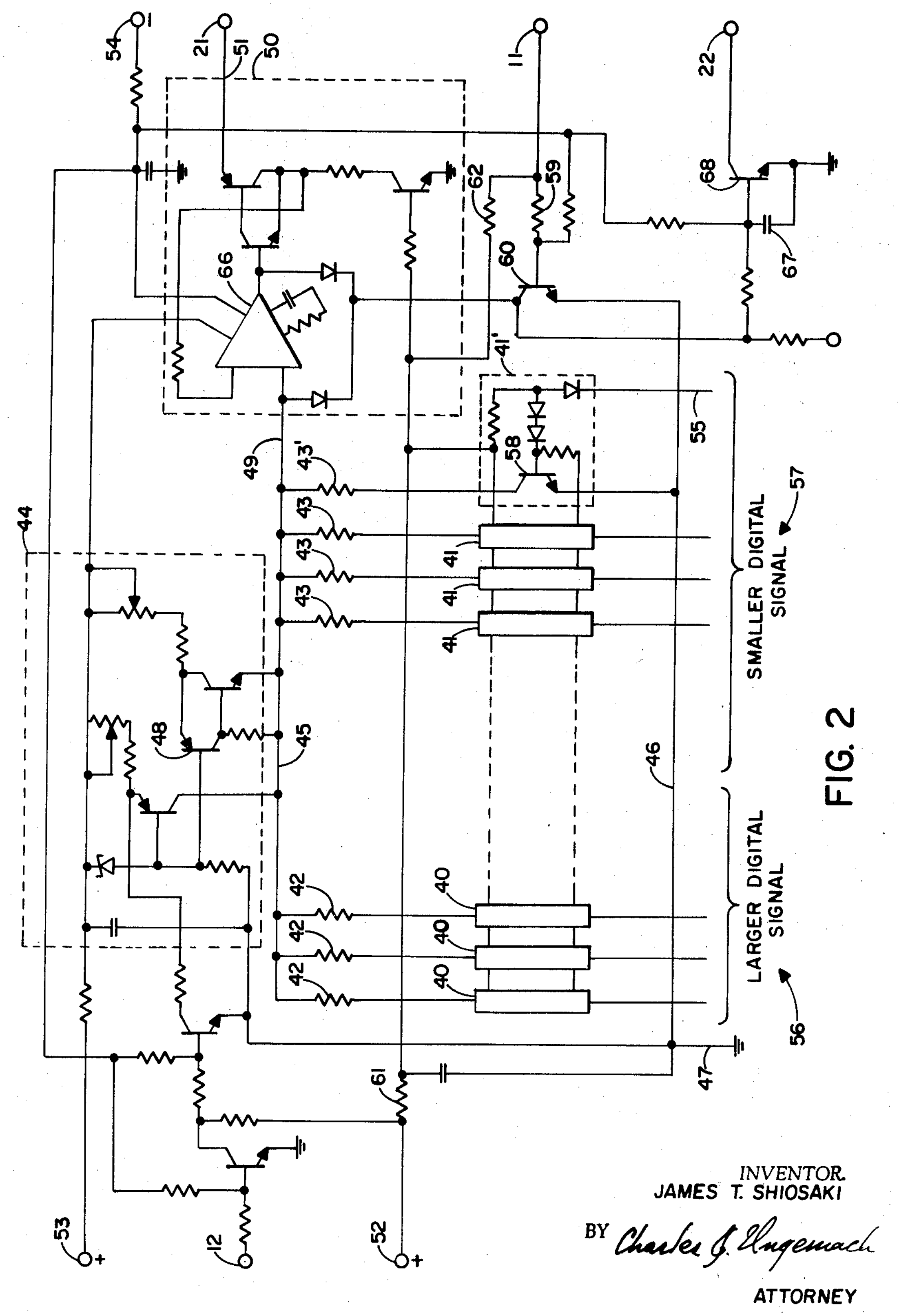
FIG. 2 is a schematic diagram of a digital to analog converter in accordance with the applicant's invention for producing an analog signal indicative of the sum of predetermined functions of a pair of digital signals.

Attention is now directed to FIGS. 2 and 3 wherein elements corresponding to certain elements shown in FIG. 1 are identified with like reference numerals. FIG. 2 shows the details of a digital to analog converter used in the applicant's invention. This converter operates generally as follows. Digital input signals representing quadrature components of a line segment are used to control a plurality of switching elements 40, 41 and 41' which connect selected ones of a plurality of resistors 42, 43 and 43' in a weighted resistor network between the supply terminals of a constant current source 44. Specifically, one end of each of resistors 42, 43 and 43' is connected to one supply terminal by means of a conductor 45. Switching elements 40, 41 and 41' are respectively connected between the other ends of resistors 42, 43 and 43' and a conductor 46 which leads from the other supply terminal. Conductor 46 is grounded as shown at 47.

The switching elements and resistors are generally separated into two sets (40, 42 and 41, 43, 41', 43') for independently responding to digital signals representing the larger and smaller quadrature components respectively of a line segment whose length is to be approximated. Means for supplying the proper digital input signal to the appropriate set of switching elements will be discussed in detail in the description associated with FIG. 3. The resistors in each set of resistors in the network are weighted in a binary manner to correspond to the characteristics of the digital input signals. In addition, the resistors in the two sets are selected to provide conductances related by a factor of 0.4 to 0.96, resistors having the lower impedances. This relationship of the resistors in the network results in a voltage on conductor 45 whose magnitude is inversely proportional to the sum of 0.96 and 0.4 respectively times the larger and smaller quadrature components of the line segment. The voltage signal on conductor 45 is supplied to a control input 49 of a second current source 50 which produces a current at an output 51 whose magnitude is inversely proportional to the approximate length of the line segment. The current at output 51 is supplied to generator 20 by means of conductor 21, as previously noted.

The converter of FIG. 2 is shown with a pair of terminals 52 and 53 which are connected to sources of positive supply voltage. A terminal 54 is connected to a source of negative supply voltage. The voltages supplied at terminals 52, 53 and 54 power current sources 44 and 50 and certain other circuitry in the converter. As previously noted, current source 44 produces a constant current. The constant current has one of two values depending on whether or not a long line segment is indicated. A long line segment is indicated by a signal supplied to long line signal input 12. This signal increases the current supplied by source 44 by altering the bias to a transistor 48 in the source. Absent this provision, a long line segment would produce a very low voltage on conductor 45. Increasing the current produced by source 44, and hence, increasing the voltage on conductor 45 reduces the possibility of errors due to noise, thereby providing a more accurate indication of the length of the segment. Compensation for the increased current is provided in ramp generator 20 by correspondingly increasing the capacitance therein in response to the long line signal which is supplied at input 23 as shown in FIG. 1. A more detailed description of this feature of generator 20 is contained in parent application Ser. No. 806,366.

All of switching elements 40, 41 and 41' may be identical. One of these switching elements (identified by reference numeral 41') is shown in detail. This switching element has a control signal input 55 which is connected to receive a binary signal of a particular order (e.g., the lowest order) from the digital signal representing the smaller quadrature component. The control signal inputs which collectively receive the digital signals representing the larger and smaller quadrature components are respectively identified by reference numerals 56 and 57. A binary signal supplied to an input 55 causes a transistor 58 within switching element 41' either to conduct or not to conduct. For example, if the signal supplied to input 55 represents a binary one, transistor 58 will conduct and complete a current path through resistor 43'. Similarly, if a signal representing a binary one is supplied to the input of any of the other switching elements 40 and 41, those switching elements will become conductive and complete current paths through the resistors 42 and 43 with which they are associated. Each additional switching element which is made conductive decreases the impedance between the supply terminals of current source 44, and thus lowers the voltage on conductor 45. Further, the resistors in the resistor network are weighted such that those connected to switching elements receiving the highest order binary signals have the lowest impedance. Thus, a binary one in a higher order position lowers the voltage on conductor 45 more than a binary one in a lower order position.

When display of a line segment is commanded, thus requiring approximation of its length, a start signal is supplied to start signal input 11. Input 11 is connected through a resistor 59 to the base of a transistor 60. Transistor 60 is normally in a conductive condition as a result of a bias current from terminal 52 through resistors 61 and 62. When a start signal is received, transistor 60 becomes non-conductive, thus disconnecting an operational amplifier 66 in current source 50 from ground. The switching of transistor 60 is also transmitted to conductor 22 after a capacitor 67 is charged sufficiently to cause a transistor 68 associated therewith to become conductive. The grounded condition of conductor 22 will then allow the capacitor(s) within generator 20 to charge. A positive signal on conductor 22 is used to maintain the capacitor(s) in a discharged condition between the display of line segments. At the same time, the voltage signal on conductor 45 will be effective to cause amplifier 66 to produce a current at output 51, and hence on conductor 21, which is inversely proportional to the approximate length of the line segment represented by the digital signals at signal inputs 56 and 57.

The logic circuit shown in FIG. 3 represents one means for selecting the larger and smaller of two digital signals. The $\Delta X$ and $\Delta Y$ component signals are supplied to an exclusive OR circuit or reversing switching means 80 through signal inputs 13 and 14. In addition, the $\Delta X$ and $\Delta Y$ component signals are respectively supplied to digital to analog converters 81 and 82. The analog signals from D to A converters 81 and 82 are supplied as input signals to a differential amplifier 83. Amplifier 83 supplies a signal to circuit 80 to control its state so that the larger of the $\Delta X$ and $\Delta Y$ component signals always appears at signal inputs 56, and the smaller of the $\Delta X$ and $\Delta Y$ component signals always appears at signal inputs 57. Thus, the digital signals representing the larger and smaller quadrature components of a line segment to be displayed are supplied to the appropriate set of switching elements shown in FIG. 2.

As is apparent from the preceding discussion, the applicant's unique line length approximation circuit produces an analog signal whose magnitude is inversely proportional to the approximate length of a line segment represented by digitally specified quadrature components of the segment. This is accomplished by using digital signals representing the larger and smaller quadrature components respectively to provide current paths through selected impedance elements in an impedance network, and thereby produce an analog voltage between the network and a source supplying constant current to the network. The analog voltage may be used control a variable current source which, in turn, produces an analog current whose magnitude is inversely related to the approximate length of the line segment.

Although a specific embodiment of apparatus for approximating the line segment length is shown for illustrative purposes, other embodiments which do not depart from the applicant's contemplation and teaching will be apparent to those skilled in the art. The applicant does not wish to be limited to the disclosed embodiment, but only by the terms of the appended claims.

What is claimed is:

1. In combination with length approximation apparatus of the type wherein a constant current source and a current sink are connected by current path means whose impedance is variable in accordance with digital signals indicative of first and second quadrature components of a line segment to produce an analog signal between the source and the path means whose magnitude is indicative of the length of the segment, the improvement which comprises:
- first signal conversion means for providing a current path whose impedance varies as a first function of a digital signal supplied thereto, said first signal conversion means being connected between the current source and the current sink;
- second signal conversion means for providing a current path whose impedance varies as a second function of a digital signal supplied thereto, said second signal conversion means being connected between the current source and the current sink; and
- means for supplying the digital signal indicative of only the larger of the first and second quadrature components to said first signal conversion means, and supplying the digital signal indicative of only the smaller of the first and second quadrature components to said second signal conversion means.

2. The apparatus of claim 1 wherein the impedance of the current path provided by said first signal conversion means varies inversely as 0.96 times the digital signal supplied thereto, and the impedance of the current path provided by said second signal conversion means varies inversely as 0.4 times the digital signal supplied thereto, whereby the magnitude of the analog signal produced between the source and the path means is substantially inversely proportional to the length of the line segment.

3. The apparatus of claim 2 wherein said first and second signal conversion means each comprise at least one series combination of an impedance element and electronic switching means operable in response to a digital signal, said series combination being connected between the current source and the current sink.

4. Apparatus for producing an analog signal indicative of the length of a line segment having quadrature components represented by a pair of digital signals, the apparatus comprising:
- a constant current source;
- a current sink;
- current path means for providing a current path whose conductance varies in accordance with a first function of a first digital input signal and a second function of a second digital input signal;
- means for connecting said current path means between said current source and said current sink; and
- means for supplying only the larger and only the smaller of a pair of digital input signals representing quadrature components of a line segment to said current path means as the first and second digital input signals respectively, whereby an analog voltage inversely related to the length of the line segment is produced between said constant current source and said current path means.

5. The apparatus of claim 4 further including:
- a variable current source for producing current whose magnitude is controlled by a voltage input signal; and
- means for supplying the analog voltage signal produced between said constant current source and said current path means as the voltage input signal of said variable current source, whereby said variable current source produces an analog current whose magnitude is inversely related to the length of the line segment.

6 The apparatus of claim 4 wherein said current path means provides a current path whose conductance varies in accordance with the sum of 0.96 times the first digital input signal and 0.4 times the second digital input signal, whereby the analog voltage produced between said constant current source and said current path means is substantially inversely proportional to the length of the line segment.

7. The apparatus of claim 6 wherein said current path means includes at least one series combination of an impedance element and electronic switching means operable in response to a digital signal.

8. The apparatus of claim 7 wherein said current path means comprises a resistor network including a plurality of weighted resistive elements, each in series with an electronic switching element operable in response to a digital signal.

* * * * *